(12) United States Patent
Seara

(10) Patent No.: US 6,805,366 B1
(45) Date of Patent: Oct. 19, 2004

(54) PORTABLE SHOPPING CART APPARATUS

(76) Inventor: Albert Seara, 20830 SW. 240$^{th}$ St., Homestead, FL (US) 33031

( * ) Notice: Subject to any disclaimer, the term of this patent is extended or adjusted under 35 U.S.C. 154(b) by 46 days.

(21) Appl. No.: 10/319,898

(22) Filed: Dec. 16, 2002

(51) Int. Cl.$^7$ .............................................. B62B 1/00
(52) U.S. Cl. ............... 280/47.26; 280/79.3; 280/DIG. 4
(58) Field of Search ............................ 280/79.2, 79.3, 280/79.5, 79.6, 79.7, 47.26, DIG. 4; D6/415, 458; 211/13.1, 133.1, 133.2

(56) References Cited

U.S. PATENT DOCUMENTS

| | | | | |
|---|---|---|---|---|
| 48,989 | A | * 7/1865 | Palmenbury | 211/163 |
| 1,693,826 | A | * 12/1928 | Stolenberg | 211/85.3 |
| 2,065,845 | A | * 12/1936 | Weaver | 211/56 |
| 2,071,290 | A | * 2/1937 | Scriba | 211/58 |
| D182,356 | S | * 3/1958 | Cohen | D6/458 |
| D183,960 | S | * 11/1958 | Carroll | D34/24 |
| 2,893,566 | A | * 7/1959 | Shenker | 211/129.1 |
| D191,812 | S | * 11/1961 | Tiriet | D6/458 |
| 3,076,527 | A | * 2/1963 | Chusid et al. | 186/65 |
| 3,106,409 | A | 10/1963 | Berlin | |
| 3,303,938 | A | 2/1967 | Solomon | |
| 3,424,317 | A | * 1/1969 | Singer | 211/167 |
| 3,633,932 | A | 1/1972 | Holden | |
| 3,722,905 | A | 3/1973 | Solomon | |
| 3,782,752 | A | * 1/1974 | Gobetz | 280/47.19 |
| 3,921,814 | A | 11/1975 | Solomon | |
| D240,102 | S | * 6/1976 | Redler | D6/458 |
| 3,963,126 | A | * 6/1976 | Taub | 211/131.1 |
| 4,632,412 | A | * 12/1986 | Nasgowitz | 280/47.26 |
| D294,894 | S | 3/1988 | Valento | |
| 4,858,772 | A | * 8/1989 | Phillipson | 211/36 |
| D314,294 | S | * 2/1991 | Axhamre | D6/458 |
| 5,145,135 | A | * 9/1992 | Thompson | 248/201 |
| 5,595,395 | A | * 1/1997 | Wilson | 280/47.26 |
| 5,725,106 | A | * 3/1998 | Wilson | 211/13.1 |
| D396,923 | S | * 8/1998 | Moore | D34/24 |
| 6,131,745 | A | * 10/2000 | Baker, Jr. | 211/13.1 |
| 6,241,105 | B1 | * 6/2001 | Pomper | 211/85.2 |
| 6,502,707 | B1 | * 1/2003 | Sullivan | 211/163 |

* cited by examiner

Primary Examiner—Christopher P. Ellis
Assistant Examiner—Kelly E Campbell

(57) ABSTRACT

A portable shopping cart apparatus for allowing a user to transport all consumer items including hanging clothes through a department store. The portable shopping cart apparatus includes a base assembly including a base member, and also including a wheel assembly upon which the base member is mounted; and also includes an elongate upright support member being attached to the base member and extending upwardly therefrom; and further including a basket assembly being mounted about the elongate upright support member; and also including a hanger support assembly being attached to the basket assembly for supporting hanging clothes.

3 Claims, 2 Drawing Sheets

PORTABLE SHOPPING CART APPARATUS

BACKGROUND OF THE INVENTION

1. Field of the Invention

The present invention relates to portable shopping carts and more particularly pertains to a new portable shopping cart apparatus for allowing a user to transport all consumer items including hanging clothes through a department store.

2. Description of the Prior Art

The use of portable shopping carts is known in the prior art. More specifically, portable shopping carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,633,932; 3,106,409; 3,303,938; 3,921,814; 3,722,905; and U.S. Pat. No. Des. 294,895.

While these devices fulfill their respective, particular objectives and requirements, the aforementioned patents do not disclose a new portable shopping cart apparatus. The prior art includes carts having baskets mounted on frames which are mounted upon wheels.

SUMMARY OF THE INVENTION

The general purpose of the present invention, which will be described subsequently in greater detail, is to provide a new portable shopping cart apparatus which has many of the advantages of the portable shopping carts mentioned heretofore and many novel features that result in a new portable shopping cart apparatus which is not anticipated, rendered obvious, suggested, or even implied by any of the prior art portable shopping carts, either alone or in any combination thereof. The present invention includes a base assembly including a base member, and also including a wheel assembly upon which the base member is mounted; and also includes an elongate upright support member being attached to the base member and extending upwardly therefrom; and further including a basket assembly being mounted about the elongate upright support member; and also including a hanger support assembly being attached to the basket assembly for supporting hanging clothes. None of the prior art includes the combination of the elements of the present invention.

There has thus been outlined, rather broadly, the more important features of the portable shopping cart apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new portable shopping cart apparatus which has many of the advantages of the portable shopping carts mentioned heretofore and many novel features that result in a new portable shopping cart apparatus which is not anticipated, rendered obvious, suggested, or even implied by any of the prior art portable shopping carts, either alone or in any combination thereof.

Still another object of the present invention is to provide a new portable shopping cart apparatus for allowing a user to transport all consumer items including hanging clothes through a department store.

Still yet another object of the present invention is to provide a new portable shopping cart apparatus that is easy and convenient to use and carry any types of items.

Even still another object of the present invention is to provide a new portable shopping cart apparatus that makes it much easier for the user to carry hanging clothes especially dresses and suits which need to be carried upon hangers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
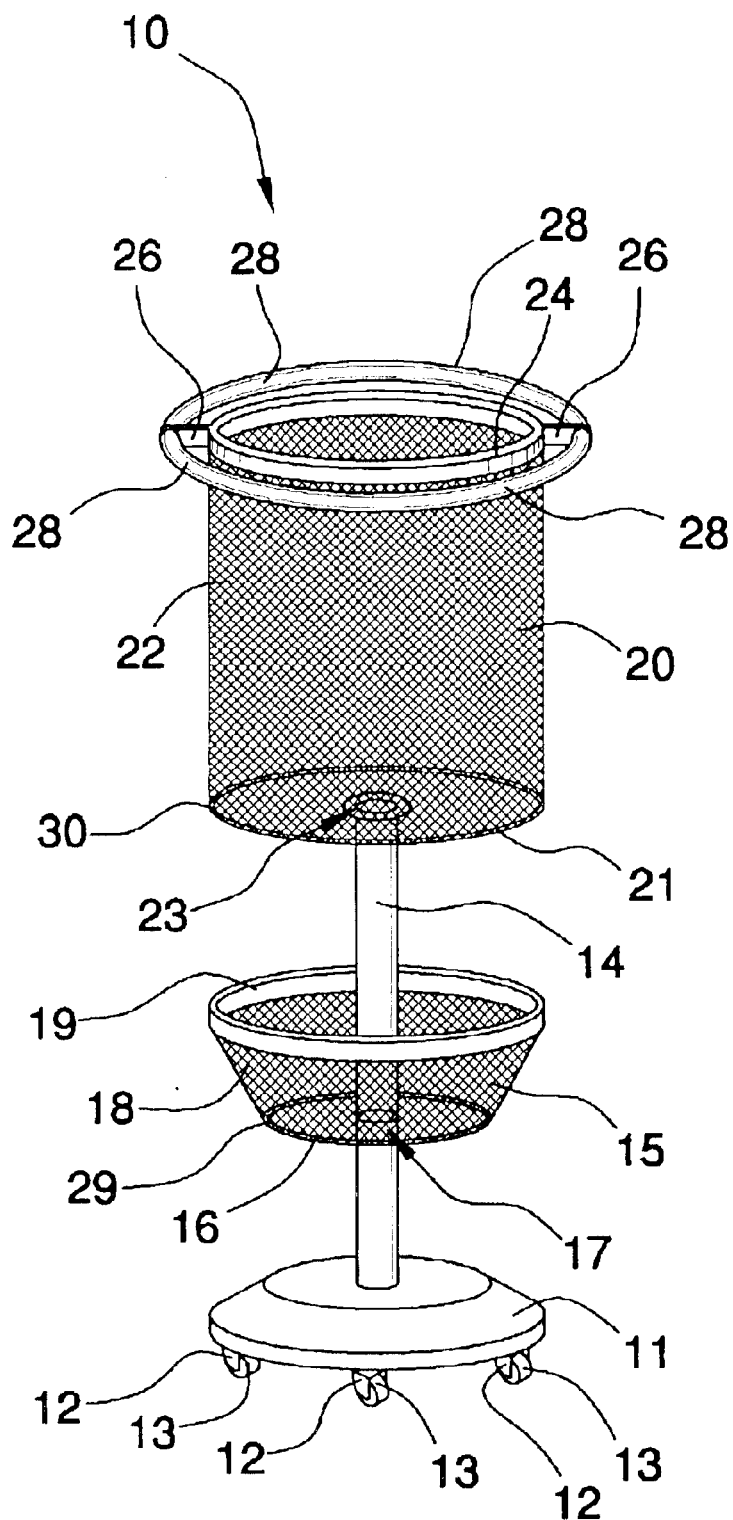
FIG. 1 is a perspective view of a new portable shopping cart apparatus according to the present invention.
Figure 2:
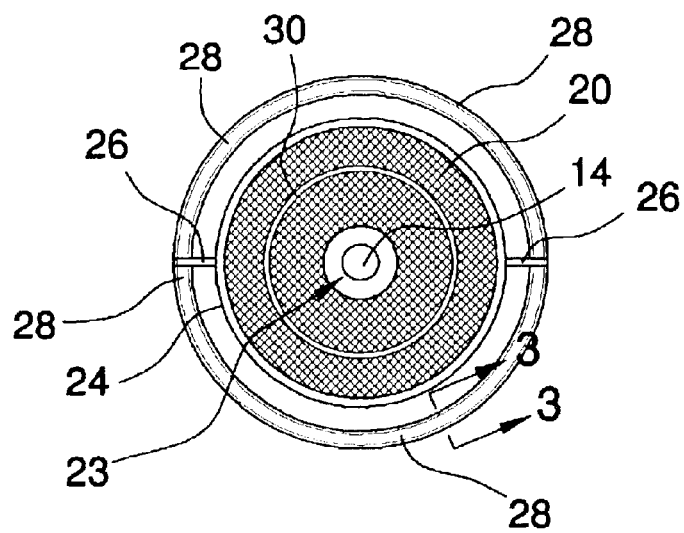
FIG. 2 is a top plan view of the present invention.
Figure 3:
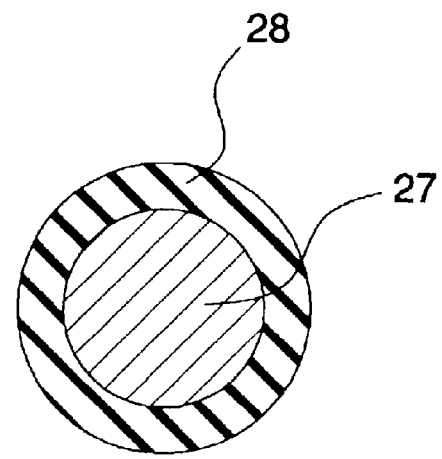
FIG. 3 is a cross-sectional view of the hanger support member of the present invention.

With reference now to the drawings, and in particular to FIGS. 1 through 3 thereof, a new portable shopping cart apparatus embodying the principles and concepts of the present invention and generally designated by the reference numeral 10 will be described.

As best illustrated in FIGS. 1 through 3, the portable shopping cart apparatus 10 generally comprises a base assembly including a base member 11, and also including a wheel assembly upon which the base member 11 is conventionally mounted. The base member 11 is saucer-shaped. The wheel assembly includes a plurality of inverted U-shaped brackets 12 being spacedly and conventionally attached to a bottom side of the base member 11, and also includes a plurality of wheel members 13 being rotatably and conventionally mounted to the inverted U-shaped brackets 12 for moving the portable shopping cart apparatus 10 upon a ground surface.

An elongate upright support member 14 is conventionally attached to the base member 11 and extends upwardly therefrom. The elongate upright support member 14 is a pole being conventionally attached to a top side of the base member 11. A basket assembly is conventionally mounted about the elongate upright support member 14. The basket assembly includes a first basket member 15 being conventionally mounted about a lower portion of the pole 14 and having bottom and side walls 16,18 which are made of mesh material. The bottom wall 16 has a hole 17 being centrally disposed therethrough and through which the pole 14 is received. The first basket member 15 also has an upper mesh support ring 19 being conventionally attached along a top edge of the side wall 18, and also has a lower mesh support ring 29 conventionally interconnecting the side wall 18 to the bottom wall 16. The basket assembly also includes a second basket member 20 being conventionally mounted about an upper portion of the pole 14 and having bottom and side walls 21,22 being made of mesh material. The bottom wall 21 of the second basket member 20 has a hole 23 being centrally disposed therethrough and through which the pole 14 is received. The second basket member 20 also has an upper mesh support member 24 being conventionally attached along a top edge of the side wall 22 of the second basket member 20, and also has a lower mesh support ring 30 conventionally interconnecting the side wall 22 to the bottom wall 21. The second basket member 20 is relatively larger than the first basket member 15 and has a greater storage depth than that of the first basket member 15. The first basket member 15 is generally bowl-shaped, and the second basket member 20 is cylindrical-shaped.

A hanger support assembly is conventionally attached to the basket assembly for supporting hanging clothes. The hanger support assembly includes bracket members 26 being conventionally attached to the upper mesh support ring 24 of the second basket member 20 and extends outwardly therefrom, and also includes curved rods 27 having ends being conventionally attached to the bracket members 26, and further includes tubular pad members 28 being mounted about the curved rods 27. The curved rods 27 and the tubular pad members 28 in combination form a ring spaced from the upper mesh support ring 24 of the second basket member 20.

In use, the user places non-hanging items in the first and second basket members 15,20 and suspends clothing on hangers from the combination of the tubular padded members 28 and the curved rods 27 to prevent damaging the articles of clothing. The user can conveniently collect all the purchased consumer items in and on one convenient portable shopping cart assembly 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the portable shopping cart apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable shopping cart apparatus comprising:
   a base assembly including a base member, and also including a wheel assembly upon which said base member is mounted, said base member being saucer-shaped, said wheel assembly including a plurality of inverted U-shaped brackets being spacedly attached to a bottom side of said base member, and also including a plurality of wheel members being rotatably mounted to said inverted U-shaped brackets for moving said portable shopping cart apparatus upon a ground surface;
   an elongate upright support member being attached to said base member and extending upwardly therefrom, said elongate upright support member being a pole being attached to a top side of said base member;
   a basket assembly being mounted about said elongate upright support member, said basket assembly including a first basket member being mounted about a lower portion of said pole and having bottom and side walls which are made of mesh material, said bottom wall having a hole being centrally disposed therethrough and through which said pole is received, said first basket member also having an upper mesh support ring being attached along a top edge of said side wall, and also having a lower mesh support ring interconnecting said side wall to said bottom wall, said basket assembly also including a second basket member being mounted about an upper portion of said pole and having bottom and side walls being made of mesh material, said bottom wall of said second basket member having a hole being centrally disposed therethrough and through which said pole is received, said second basket member also having an upper mesh support ring being attached along a top edge of said side wall of said second basket member, and also having a lower mesh support ring interconnecting said side wall to said bottom wall of said second basket member; and
   a hanger support assembly being attached to said basket assembly for supporting hanging clothes, said hanger support assembly including bracket members being attached to said upper mesh support ring of said second basket member and extending outwardly therefrom, and also including curved rods having ends being attached to said bracket members, and further including tubular pad members being mounted about said curved rods, said curved rods and said tubular pad members in combination forming a ring spaced from said upper mesh support ring of said second basket member.

2. A portable shopping cart apparatus as described in claim 1, wherein said second basket member is relatively larger than said first basket member and has a greater storage depth than that of said first basket member.

3. A portable shopping cart apparatus as described in claim 2, wherein said first basket member is generally bowl-shaped, and said second basket member is cylindrical-shaped.

* * * * *